(12) United States Patent
Callebresi

(10) Patent No.: US 7,311,343 B2
(45) Date of Patent: Dec. 25, 2007

(54) TEMPORARY HANDLES FOR MOVING AWKWARDLY SIZED OBJECTS

(76) Inventor: Jerry F. Callebresi, 3605 E. Spilman Rd., New Cambria, KS (US) 67470

( * ) Notice: Subject to any disclaimer, the term of this patent is extended or adjusted under 35 U.S.C. 154(b) by 0 days.

(21) Appl. No.: 11/543,610

(22) Filed: Oct. 5, 2006

(65) Prior Publication Data

US 2007/0006427 A1   Jan. 11, 2007

(51) Int. Cl.
*B65G 7/12* (2006.01)
(52) U.S. Cl. ............... 294/15; 294/157; 294/165
(58) Field of Classification Search ........... 294/15, 294/27.1, 31.2, 149, 150, 152, 153, 157, 294/165; 16/422–425
See application file for complete search history.

(56) References Cited

U.S. PATENT DOCUMENTS

| | | | | |
|---|---|---|---|---|
| 164,994 | A * | 6/1875 | Harrell | 294/154 |
| 1,406,052 | A * | 2/1922 | Matthiasen | 294/26 |
| 2,193,054 | A * | 3/1940 | Bowen | 294/15 |
| 2,456,917 | A * | 12/1948 | Cheek | 294/141 |
| 2,515,826 | A * | 7/1950 | Hall | 294/153 |
| 2,606,054 | A * | 8/1952 | Cole | 294/15 |
| 4,116,374 | A * | 9/1978 | Garello | 294/150 |
| 4,487,443 | A * | 12/1984 | Adamick | 294/151 |
| 4,521,045 | A | 6/1985 | Hart | |
| 4,656,566 | A * | 4/1987 | Kelley | 362/202 |
| 4,794,683 | A * | 1/1989 | Pacheco | 29/278 |
| 5,503,448 | A | 4/1996 | Dewey | |
| 5,531,495 | A * | 7/1996 | Hohman | 294/31.2 |
| 5,730,479 | A * | 3/1998 | Jansson | 294/31.2 |
| 5,927,781 | A | 7/1999 | Lyons, Jr. | |
| 6,039,376 | A | 3/2000 | Lopreciato | |
| 6,102,462 | A | 8/2000 | Fields | |
| 6,508,389 | B1 | 1/2003 | Ripoyla et al. | |
| 6,729,511 | B2 | 5/2004 | Dent, III | |
| 6,729,665 | B1 * | 5/2004 | Posey et al. | 294/31.2 |
| 6,893,067 | B1 * | 5/2005 | Ayala | 294/15 |
| 7,077,447 | B1 | 7/2006 | Betway | |
| 2005/0103813 | A1 | 5/2005 | Edwards | |
| 2005/0263551 | A1 | 12/2005 | Dent, III | |

* cited by examiner

*Primary Examiner*—Dean J Kramer
(74) *Attorney, Agent, or Firm*—Kenneth W. Iles

(57) ABSTRACT

A pair of handles is strapped or screwed to a load, such as a used furnace to allow it to be picked up and carried more readily. Each handle projects above the top edge of the load and is connected to an elongated member that is flat against one side of the load. The elongated members may also be screwed to the load. In one embodiment, the bars have an upstanding rib for reinforcement and three slots for threading webbing straps through. In another embodiment, the elongated members are essentially lengths of angle iron with handles attached to the upper ends and the two legs of the elongated members fit along a corner edge of the load.

3 Claims, 4 Drawing Sheets

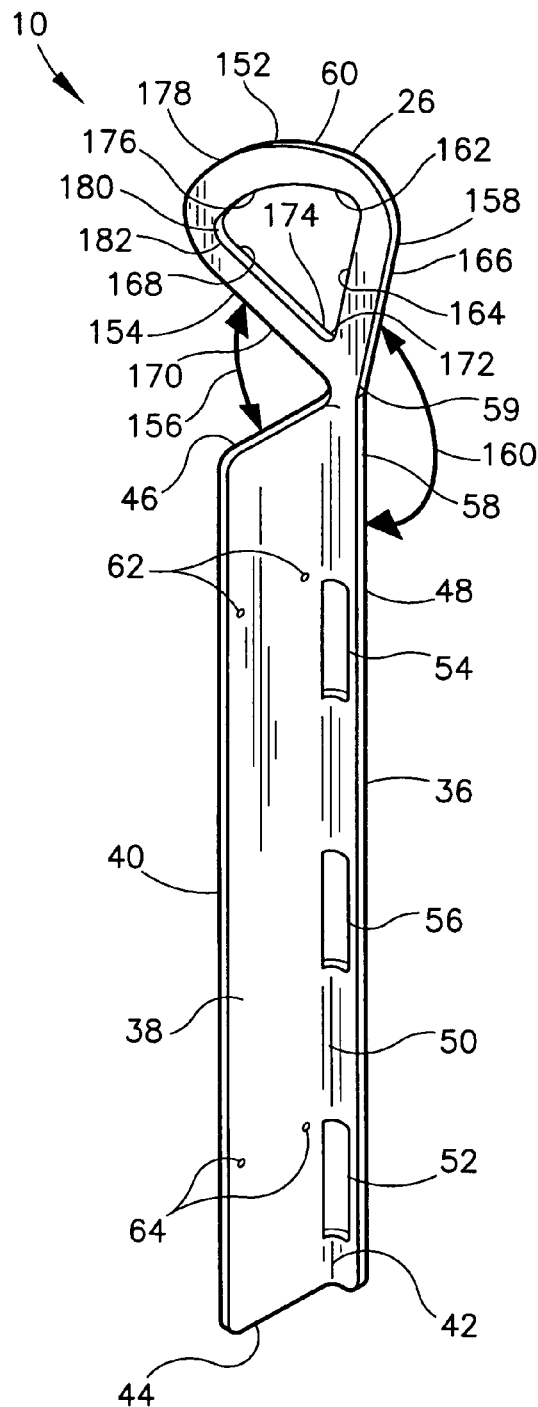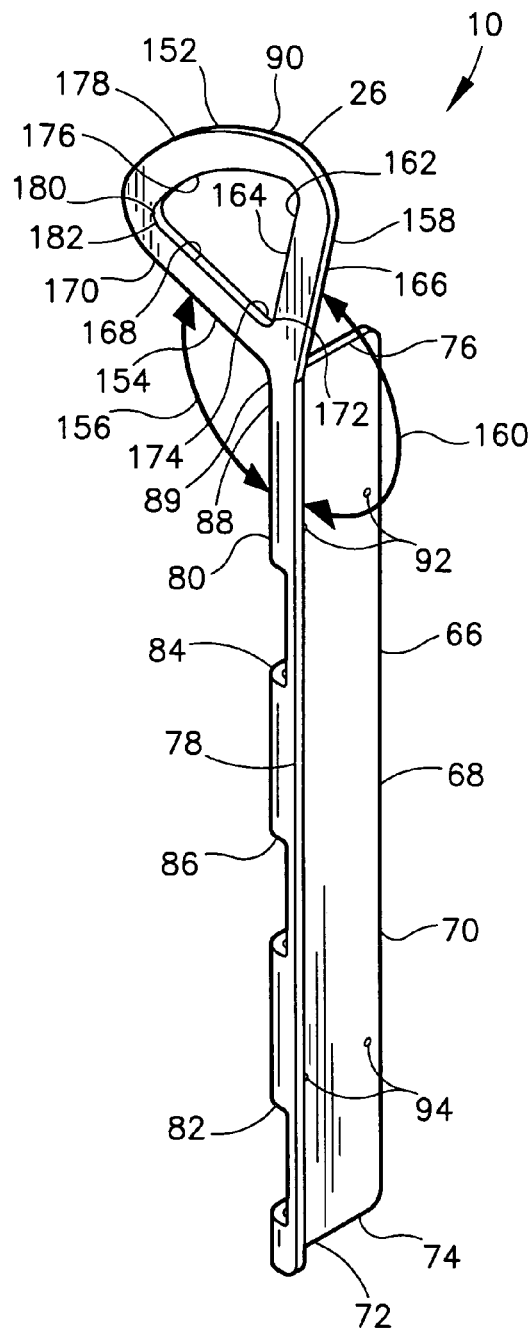

TEMPORARY HANDLES FOR MOVING AWKWARDLY SIZED OBJECTS

CROSS-REFERENCE TO RELATED APPLICATIONS

Not Applicable.

STATEMENT REGARDING FEDERALLY SPONSORED RESEARCH OR DEVELOPMENT

Not applicable.

SEQUENCE LISTING

Not applicable

BACKGROUND OF THE INVENTION

The present invention is a pair of handles designed to be temporarily attached to an awkwardly sized object, such as a residential furnace, to facilitate manual moving of the object.

Moving awkwardly sized objects that have few or no natural gripping surfaces can be difficult, particularly when they must be moved up and down stairs, especially when it is not desired to use a hand truck or dolly, which typically gouge the stairs, causing unacceptable damage. A good example of such objects is a household furnace. When they need to be replaced, they often must be removed from basements and the replacement furnace moved into the basement. Usually, workers must carry the old furnace up the stairs and carry the new furnace down the stairs. A household furnace typically weights about 80-90 kilograms (175-200 pounds). Using a wheeled dolly or hand truck is not desirable because using these on stairs increases the risk of injury because the load can roll uncontrollably down the stairs; the bottom man must bend over near the stairs to have any effect on the moving; and dollies tear up the stairs. In moving a furnace down the stairs, it is important not to jar or jostle the unit because this can damage electronic circuitry and mechanical control systems. Therefore, it is preferable for workers to carry furnace manually.

Typically, workers place one hand on each of two opposed sides of the furnaces and squeeze hard. This practice does not provide a sound grip, so the furnace can slip from the grip and it unnecessarily strains muscles.

Efforts to address the problem of gripping and carrying awkwardly sized objects have led to numerous patents. For example, US 2005/0103813 A1, a published patent application disclosing an invention by Edwards and published on May 19, 2005, discloses an Adjustable Dual Strap Design for Lifting and Carrying Awkward or Heavy Loads, comprising an end loop on each end of a strap for passing over each shoulder of a worker. Another such strap includes a number of small loops extending a middle portion of the loop. The worker with the straight strap passes his strap through one of the smaller loops to determine easily the length of the whole strap system between the two workers.

Other examples of apparatus designed to make lifting and carrying awkwardly sized objects include the following references.

Another published patent application, US 2005/0263551 A1, a published patent application disclosing an invention by Dent, III and published on Dec. 1, 2005, discloses a Simplified Two-Man Lifting Harness comprising a shoulder harness having a pair of straps that cross across the back and taper from the shoulders to the waist so that they meet at a buckle at their lower front ends, with the buckle fastened to a lifting strap held by one worker at each end, with each worker being connected to a separate harness.

U.S. Pat. No. 7,077,447 B1, issued to Betway on Jul. 18, 2006, discloses a Method for Manually Carrying a Load comprising a flexible ladder having a pair of parallel flexible cables fixed to a number of rungs fixed to the two cables and perpendicular to them, as shown in FIG. 1, with the load appropriately placed on the flexible ladder on the floor and then picked up by two workers using the rung members.

U.S. Pat. No. 6,729,511 B2, issued to Dent, III on May 4, 2004, discloses a Lifting Harness comprising an over-the-shoulders harness that crosses in the back and falls straight down the worker's front, with a buckle at the lower font end of the straps and a waist belt that is joined to the shoulder straps at the front. Two workers wear a separate shoulder harness and connect a long belt to the harnesses, with a load placed on the long belt, FIGS. 1-3.

U.S. Pat. No. 6,508,389 B1, issued to Ripoyla et al. on Jan. 21, 2003, discloses a Harness System for Lifting Objects comprising a separate shoulder harness, each worn by a different worker, with each harness including an outer loop, with the two loops joined together to place under the load.

U.S. Pat. No. 6,102,462 B1, issued to Fields on Aug. 15, 2000, discloses a Mattress and Sheet Material Carrying Apparatus comprising a closed loop of webbing having a pair of spaced depending smaller U-shaped straps sewn onto the closed loop strap for retaining the bottom of a load when a separate worker picks up each end of the closed loop main strap, as shown in FIGS. 1, 3. The device is most suitable for narrow loads such as a mattress or stacked sheets of plywood or the like.

U.S. Pat. No. 6,039,376 B1, issued to Lopreciato on Mar. 21, 2000, discloses Forearm Furniture Leverage Straps comprising a strap with three different small loops for receiving a worker's forearms on each end. The worker can select which loop to insert his arm into. Each of two workers places a strap under a load so that the two straps cross under the load and then the workers pick up the load with their hands assisted by the straps on their arms.

U.S. Pat. No. 5,927,781 B1, issued to Lyons, Jr. on Jul. 27, 1999, discloses a Strap Apparatus for Carrying Relatively Large Objects comprising a system of interlocking strap loops, the length of each can be adjusted through use of a buckle. The strap loops allow a loop to be disposed across corners of boxes and the like, as shown in FIGS. 1, 5.

U.S. Pat. No. 5,503,448 B1, issued to Dewey on Apr. 2, 1996, discloses a Strap Apparatus for Hauling Large Objects comprising a figure-8 shaped strap having an adjustment buckle at its center, with a pair of opposed semi-rigid handles at each outer end of the loops, with the center of the whole strap being placed in the middle of the bottom of a load and the handles projecting outwardly from the load to be picked up by two workers.

U.S. Pat. No. 4,521,045 B1, issued to Hart on Jun. 4, 1985, discloses a Mattress Carrier comprising a fitted cover that a mattress is inserted into and secured by a long zipper along three sides, enclosing the mattress. The mattress cover is equipped with straps having loop handles for providing allowing workers to carry the mattress easily.

These devices rely on flexible straps, which are themselves awkward and time consuming to install and adjust. Further, a substantial amount of room is needed to place the straps into position about the load. Further the space needed for workers to utilize the strap systems is significant in many cases, preventing their use in tight quarters, e.g., stairs. Finally, none provides a solid load bearing ability, increasing the risk of banging the load into a wall or the like through swinging of the load, an unacceptable risk in many moving situations. Such systems can increase the risk of injury inherent in moving large heavy objects due to load shifting and the additional stress placed on the shoulders and back.

Therefore, there is a need for a device that provides a ready means for securely moving an awkwardly sized load without using a dolly; that can reduce back injuries and other injuries common to moving heavy objects, with or without the aid of sling device; that provides a rigid connection to the object being moved; that is easy to install onto the load and to remove from the load; that requires minimal work to install and to remove; that is relatively inexpensive to manufacture.

BRIEF SUMMARY OF THE INVENTION

Accordingly, it is a primary object of the present invention to provide a device in the form of temporary handles for moving awkwardly sized objects that provides a ready means for securely moving an awkwardly sized load without using a dolly.

It is another object of the present invention to provide device in the form of temporary handles for moving awkwardly sized objects that can reduce back injuries and other injuries common to moving heavy objects; that provides a rigid connection to the object being moved.

It is another object of the present invention to provide device in the form of temporary handles for moving awkwardly sized objects that is easy to install onto the load and to remove from the load.

It is another object of the present invention to provide device in the form of temporary handles for moving awkwardly sized objects that is relatively inexpensive to manufacture and that increases productivity.

The present invention addresses and solves this problem by providing a pair of handles rigidly connected to elongated rails and are fastened to the furnace or other load, preferably with sheet metal screws (the old furnace is to be junked) and 2 inch wide fabric belts that are cinched tight. Alternatively, if desired, the screws may be omitted, reducing the time and effort needed to attach the handles to the load. In any case, it is not desirable to put screws into new furniture, in new furnaces, or the like. An important characteristic of the present invention is that there are no wheels because use of a dolly or the like is undesirable in this application.

In the first embodiment, the handles are fixedly connected to an upturned edge of a flat bar member, with the flat bar member being fastened to the load and the grip portion of the handle being presented to the user in a normal gripping position. The upright flange portion to which the handle member is attached includes three spaced slots that cinching straps are passed through. One handle member is a left-hand handle member, that is the upstanding rib portion to which the handle itself is connected lies along the right-hand edge of the handle member and is intended to be gripped by the user's left hand. Another handle member is a right-hand handle member, having the upstanding rib portion to which the handle itself is attached lying to the left of the flat base portion of the handle member. The upright flange portion of the right-handed handle member further includes three spaced slots that align respectively with the three spaced slots in the left-hand handle member and are also used for receiving cinching straps to fixe the handle members to the load. Thus the temporary handles for moving awkwardly sized objects according to the present invention come in mirror image pairs.

In an alternative embodiment, each handle member includes a body consisting roughly of an angle iron-shaped member, with the handle portion connected to one flange member, so that the body of each handle member fits along a corner of a load having a right-angle edge, such as a furnace.

Other objects and advantages of the present invention will become apparent from the following description taken in connection with the accompanying drawings, wherein is set forth by way of illustration and example, the preferred embodiment of the present invention and the best mode currently known to the inventor for carrying out his invention.

BRIEF DESCRIPTION OF THE SEVERAL VIEWS OF THE DRAWING

FIG. 3 is rear perspective view of a left-handed handle member of the temporary handles for moving awkwardly sized objects of FIG. 1.

FIG. 4 is a right-hand side isometric view of the handle member of FIG. 3.

DETAILED DESCRIPTION OF THE INVENTION

Figure 1:
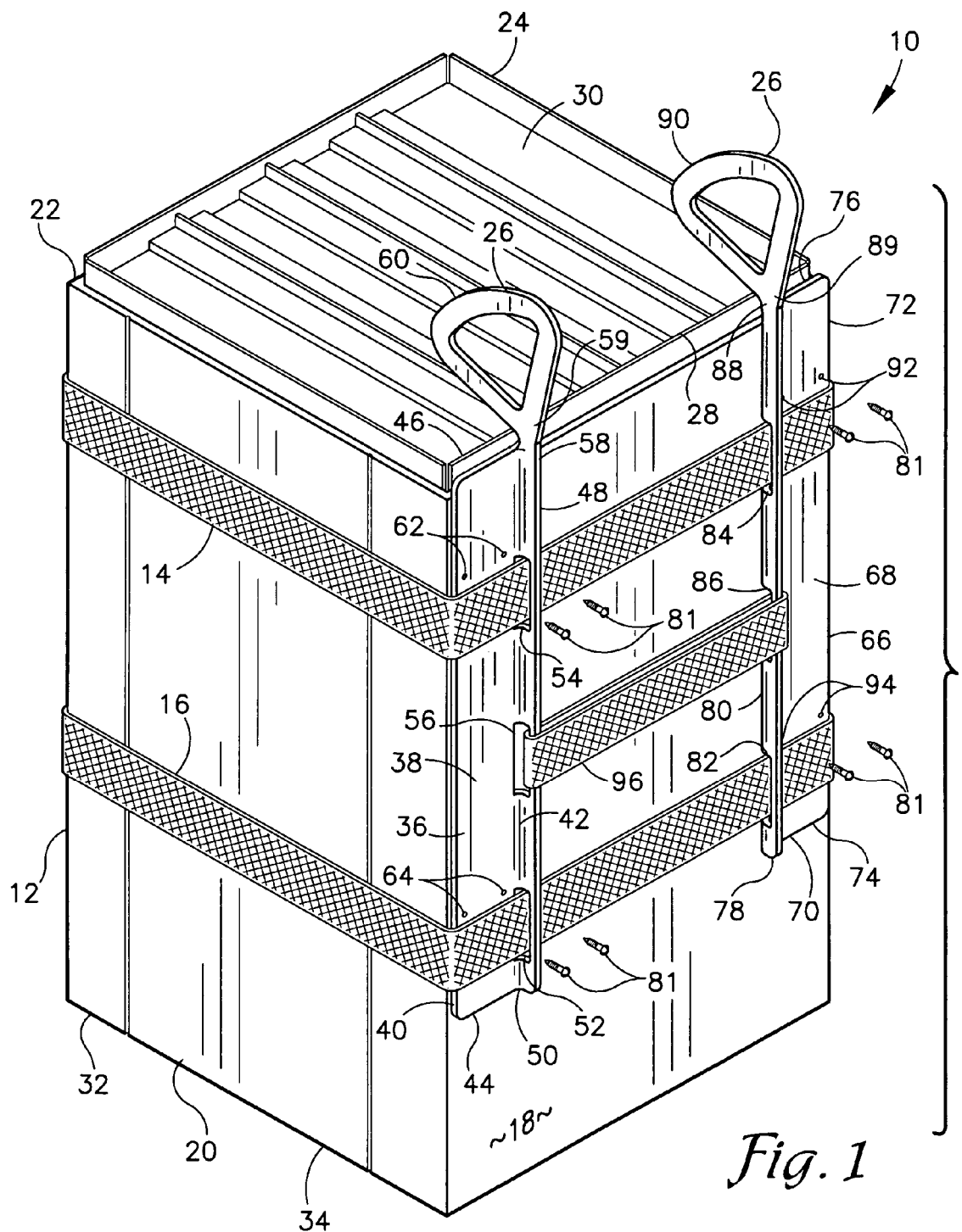
FIG. 1 is left-front isometric view of temporary handles for moving awkwardly sized objects according to the present invention attached to a load, which is a furnace.

Referring to FIG. 1, a set of two temporary handles for moving awkwardly sized objects (handle members) 10 is shown connected to a load 12 in the form of a furnace by an upper webbing strap 14 and a lower webbing strap 16, both of which are cinched tight by well known means, such as a rachet tightening mechanism (not shown). The load 12 preferably has at least one flat side wall 18, which is the rear side wall 18, and may have four connected perpendicular side walls including the rear wall 18, the right-hand side wall 20, the front side wall 22, and the left-hand side wall 24, permitting ready attachment of the handle members 10 to any side wall 18, 20, 22, 24. In most applications, one set of the handle members 10 is connected to the load with the handles 26 projecting above the top edge 28 of the top wall 30 of the load 12. These two handles 26 will be gripped by a worker, who tilts the load back toward him, which typically exposes a ledge or bottom edge 32 of the bottom wall 34 of the load 12 that can be gripped by another worker, allowing the two workers to pick up the load 12 and carry it without the load's hitting any stairs, walls, bannisters or the like.

Still referring to FIG. 1, top and bottom, left and right and so forth are as the load 12 is shown in FIG. 1. Because the load may conventionally be rotated, turned upside down or the like, these orientations may or may not be consistent with the orientation of the load 12 when the load 12, whatever it may specifically be, is in normal use.

Still referring to FIG. 1, left-hand side handle member 36 includes a flat elongated member or bar portion 38 having a left-hand edge 40, and a right-hand edge 42, a bottom edge 44 and a top edge 46. Along the right-hand lengthwise edge 42 lies an upstanding rib member 48 that runs the entire length of the flat elongated bar portion 38 and lies at a 90° to it, such that the upstanding rib member 48 projects outwardly from the load 12. The upstanding rib member 48 is joined to the flat elongated bar portion 38 by a radius 50 formed at the juncture of the two members 38, 48, which runs the length of both members. Formed into the upstanding rib member 48 adjacent to the radius 50 joining the upstanding rib member 48 and the flat elongated bar portion 38, that is, adjacent to the juncture of the elongated member and the upstanding rib member in either the left-hand side or right-hand side handle embers 10, are a lower strap-receiving slot 52, an upper receiving slot 54 and an intermediate strap receiving slot 56. The upstanding rib member 48 may alternatively run only a portion, any desired portion, of the length of the flat elongated bard portion 38, as its principal purpose is to increase the stiffness of the handle members 10, whether left-hand side or right-hand side members. The upstanding rib member 48 can be fixed to the elongated member along a line other than an edge of the elongated member 36, 68 for example, the upstanding rib member 48 can be welded along the centerline of the member Still referring to FIG. 1, connected to the upper end 58 of the upstanding rib member 48 by the extension or neck 59 is a handle portion 60, which is discussed in more detail in connection with FIG. 2 below. A pair of horizontal spaced upper fastening apertures 62 are formed into the flat elongated bar portion 38 proximate to the top edge 46 of the flat elongated bar portion 38 and a pair of horizontally spaced lower fastening apertures 64 are similarly formed into the flat elongate bar portion 38 proximate to the bottom edge 44 of the flat elongated bar portion 38.

Still referring to FIG. 1, right-hand side handle member 66 includes a flat elongated member or bar portion 68 having a left-hand edge 70, and a right-hand lengthwise edge 72, a bottom edge 74 and a top edge 76. Along the left-hand edge 70 lies an upstanding rib member 78 that runs the entire length of the flat elongated bar portion 68 and lies at a 90° to it, such that the upstanding rib member 78 projects outwardly from the load 12. The upstanding rib member 78 is joined to the flat elongated bar portion 68 by a radius 80 formed at the juncture of the two members 68, 78, which runs the entire length of both members. Formed into the upstanding rib member 78 are a lower strap-receiving slot 82, an upper receiving slot 84 and an intermediate strap receiving slot 86. Connected to the upper end 88 of the upstanding rib member 78 by the extension or neck 89 is a handle portion 90, which is discussed in more detail in connection with FIG. 2 below. A pair of horizontal spaced upper fastening apertures 92 are formed into the flat elongated bar portion 68 proximate to the top edge 76 of the flat elongated bar portion 68 and a pair of horizontally spaced lower fastening apertures 94 are similarly formed into the flat elongate bar portion 68 proximate to the bottom edge 74 of the flat elongated bar portion 38.

Still referring to FIG. 1, the left-hand side handle member 36 and the right-hand side handle member 66 are mirror images of each other, with the upstanding rib members 48, 68 respectively both lying toward the interior of the rear side wall 18. The upper webbing strap 14 is threaded through the upper strap receiving slot 54 in the upstanding rib member 48 of the left-hand side handle member 36 and through the aligned and corresponding upper strap receiving slot 84 in the upstanding rib member 78 of the right-hand side handle member 66 and is wrapped about the load 12. The lower webbing strap 16 is similarly threaded through the lower strap receiving slot 52 in the upstanding rib member 48 of the left-hand side handle member 36 and through the aligned and corresponding lower strap receiving slot 82 in the upstanding rib member 78 of the right-hand side handle member 66 and is wrapped about the load 12. Then both webbing straps 14, 16 are tightened to secure the handle member 36, 66 rigidly to the load 12. To facilitate holding the handles 36, 66 to the load 12 while the webbing straps 14, 16, are fitted and tightened, the handles 36, 66 may be attached to the load by fasteners, such as self-tapping sheet metal screws or the load may be placed on a side such that the handles 36, 66 are horizontal and will therefore be held in place by gravity while the webbing straps 14, 16 are fitted and adjusted. In this case, the webbing straps 14, 16 should be placed under the load 12 prior to setting the handle members 36, 66 on the then upper surface of the load 12. Alternatively, fasteners, such as the sheet metal screws 81 inserted through the apertures 62, 64, 92 and 94 and fastened into the load 12 can alone be used to secure the handle members 36, 66 to the load 12, in which case the webbing straps 14, 16 are not needed at all. The number of screws 81 used in either the embodiment of FIG. 1 or of FIG. 2 may be the same as the number of screw receiving apertures or may be less, as the load and the user desire or need. Again, however, in many cases, such as with a new furnace, inserting fasteners such as the sheet metal screws 81 into the load 12 may not be desirable and in this case, only the webbing straps 14, 16 should be used. Alternatively, a few sheet metal screws 81 can be used to locate and secure the handLes 36, 66 to the load 12 to facilitate attachment of the webbing straps 14, 16.

Still referring to FIG. 1, a handle webbing strap is threaded through the intermediate strap receiving slots 56, 86 and formed into a closed loop to keep the left-hand side handle member 36 and the right-hand side handle member 66 together as a set during storage and transportation. Alternatively, the intermediate strap receiving slots 56, 86 could be used for a third load securing strap, but this is unnecessary in most applications.

Figure 2:
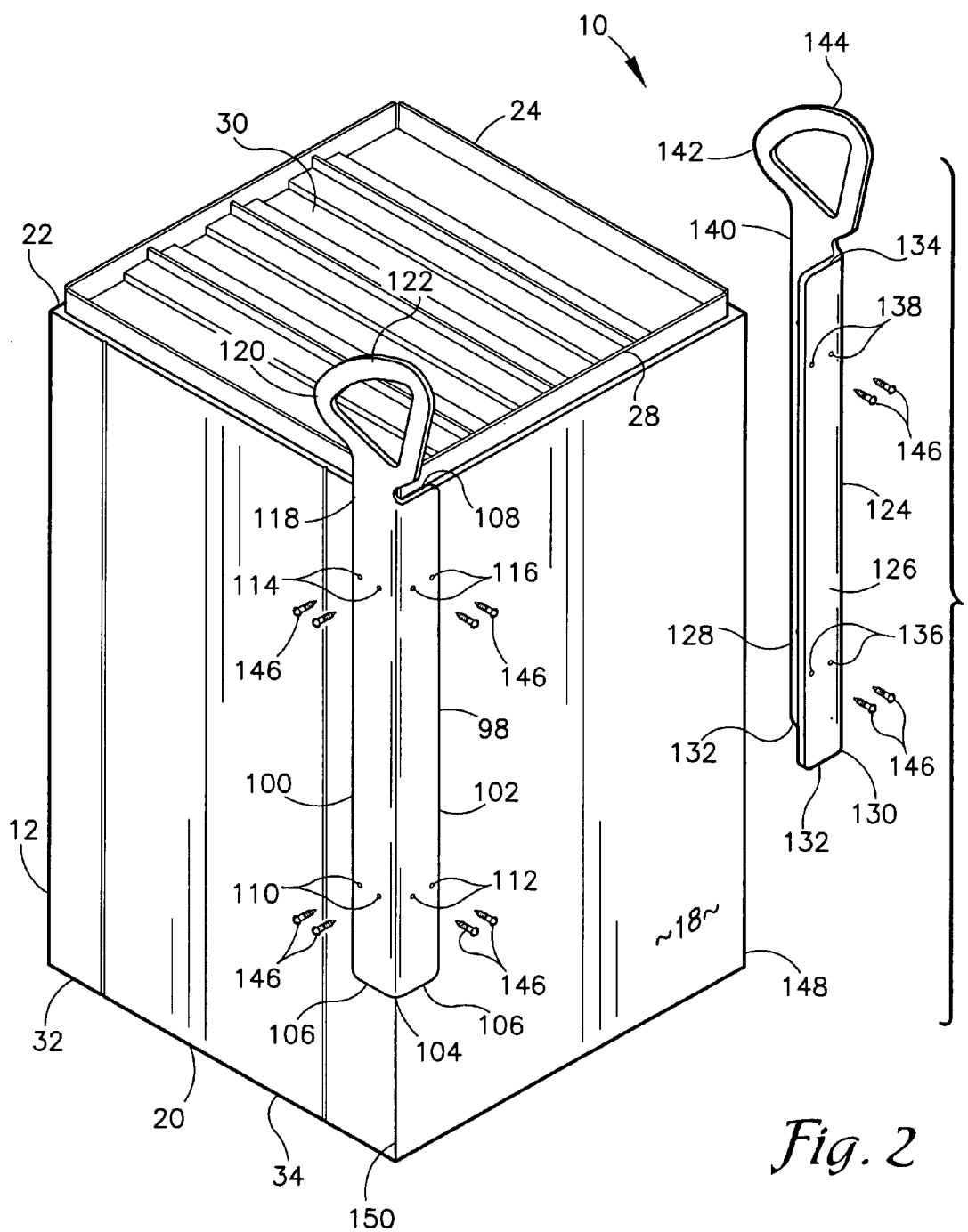
FIG. 2 is a left-front isometric view of a load illustrating the attachment of the temporary handles for moving awkwardly sized objects of FIG. 1.

Referring to FIG. 2, there is shown an alternative embodiment of the set of two temporary handles for moving awkwardly sized objects (handle members) 10, in which the handle members are basically elongated members comprising lengths of angle iron with handles attached at their upper ends. The left-hand handle 98 includes a left-hand side member 100 lying flat along the right-hand side wall 20 of the load 12 and a right-hand side member 102 lying flat along the rear flat side wall 18 or the load 12. The left-hand side member 100 and the right-hand side member 102, both of which can be viewed as flat bar stock elongated members connected along their length by a radius and that meet at the 90° angle 104, which runs from the length of the two members 100, 102 from their bottom edges 106 to the top edge 108 of the right-hand member 102 and an imaginary line extending from the top edge 108 across the left-hand member 100. A pair of spaced apart lower left-hand side apertures 10 and a pair of spaced apart lower right-hand side apertures 112 are formed in the respective side members 100, 102 in the vicinity of the bottom edges 106. A pair of spaced apart upper left-hand side apertures 114 and a pair of spaced apart upper right-hand side apertures 116 are formed in the respective side members 100, 102 in the vicinity of the top edge 108. A member extension, or neck, 118 flows upward from the left-hand member 100 and is connected to a handle 120, which includes the grip portion 122, which is arcuate for comfortable gripping.

Still referring to FIG. 2, The right-hand handle 124 includes a left-hand side member 126 lying flat along the rear side wall 18 of the load 12 and a right-hand side member 128 lying flat along the left-hand side wall 24 of the load 12. The left-hand side member 126 and the right-hand side member 128, both of which can be viewed as flat bar stock members connected along their length by a radius and that meet at the 90° angle 130, which runs from the length of the two members 126, 128 from their bottom edges 132 to the top edge 134 of the left-hand side member 126 and an imaginary line extending from the top edge 134 across the right-hand member 128. A pair of spaced apart lower left-hand side apertures 136 and a pair of spaced apart lower right-hand side apertures (not seen) are formed in the respective side members 124, 128 in the vicinity of the bottom edges 132. A pair of spaced apart upper left-hand side apertures 138 and a pair of spaced apart upper right-hand side apertures (not seen) are formed in the respective side members 126, 128 in the vicinity of the top edge 134. A right-hand side member extension, or neck, 140 flows upward from the right-hand side member 128 and is connected to a handle 142, which includes the grip portion 144.

Still referring to FIG. 2, the handles 98, 124 are secured to the load 12 with the screws 146 inserted into the apertures 110, 112, 114, 116, 136, 138 and the unseen apertures in the right-hand side member 128 of the right-hand handle 124 that correspond to the apertures 136, 138. The screws 146 are preferably self-tapping sheet metal screws. Alternatively, the left-hand side member 98 and the right-hand side member 128 can be secured to the load with the webbing straps 14, 16, or a few screws 146 can be inserted to hold the left-hand side member 98 and the right-hand side member 128 to the load 12 for easy installation and tightening of the webbing straps 14, 16. This embodiment does not include any slots for web straps because it is intended primarily for use with the screws 146 for attachment, which is quite a fast way to attach the handles 98, 124 when a power electrical screw driver or the like is used.

Still referring to FIG. 2, the embodiment first shown in FIG. 2 works best when the load has at least three flat side walls and each meeting or intersection of side walls forms a 90° or edge, such as the 90° edge 148 between the rear side wall 18 and the left-hand side wall 24 of the load 12 and the 90° edge 150 between the rear side wall 18 and the right-hand side wall 20 of the load 12.

Referring to FIGS. 3, 4 the handle portions 60, 90 each include an outermost gripping portion 152, which is arcuate for comfortable gripping. Each gripping portion 152 is connected to the respective handle member 36, 66 by a forward projecting handle attachment member 154, with forward being defined as the direction an operator would be looking when gripping the handles 36, 66 of FIG. 1 or the handles 98, 124 of FIG. 2. The forward projecting handle attachment member 154 rises at an angle to the plane of the rear wall 18 such that the handle attachment members 154 projects inwardly of the top edge of the 28 of the load 12 sufficiently that the gripping portions 152 are located inwardly of the top edge 28 of the rear side wall 18 when the handles 36, 66 are installed on the load 12. This arrangement provides the most secure style of gripping for a user. The angle between the attachment members 154 and the rear side wall 18 of the load 12, which is also the angle between the handle portion 60 and the elongated bar portion 38 of the left-hand side handle member 36 or the handle portion 90 and the elongated bar portion 68 of the right-hand side handle member 66 lies in a range of 30°-60°, with the preferred angle being the 45° angle 156.

Still referring to FIGS. 3, 4, a rear handle attachment member 158 projects upward from the upper end of the respective member to which it is attached basically along the same line as the edge of the member, but slightly angled backward toward the operator at an angle lying in a range of 5°-25°, with the preferred angle being the 15' angle 160. Each handle portion 60, 90 has a hand grip opening 162, which is basically triangular in shape, having a straight rear edge 164 parallel to the line of the outer rear edge 166, a straight front edge 168 parallel to the line of the outer front edge 170. The straight rear edge 162 has a rear edge bottom end 172 that intersects with the corresponding front edge bottom end 174 of the front edge 168. An arcuate upper portion 176 of the opening 162 is parallel to the outer curved edge 178 of the handle portions 60, 90 and includes a left-hand end 180 that intersects an upper end 182 of the straight front edge 168. More particularly, the handle portion 60 of the left-side handle member 36 projects forward of the flat elongated bar portion 38, with forward being defined inward of the top edge 28 of the load 12 and the handle portion 90 of the right-side handle member 66 projects forward or the flat elongated bar portion 68, with forward being defined inward of the top edge 28 of the load 12.

Figure 5:
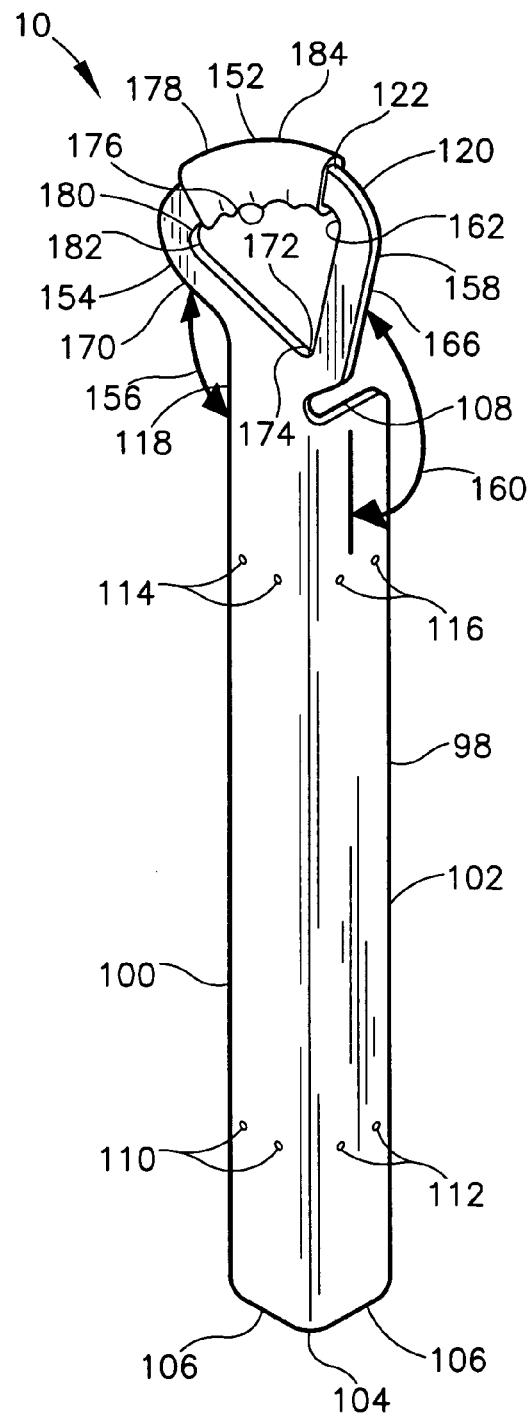
FIG. 5 is a rear front right isometric view of an alternative embodiment of the handle member of FIG. 3, further including a hand-grip pad.
Figure 6:
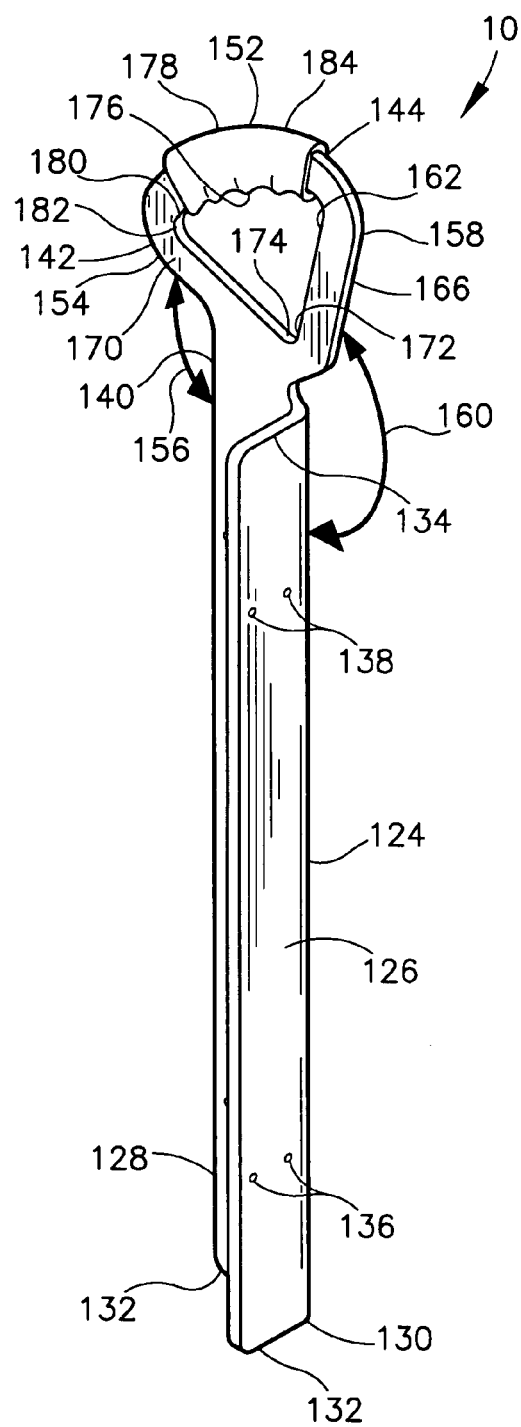
FIG. 6 is an isometric view of the handle member of FIG. 5.

Referring to FIGS. 5, 6, the alternative embodiment of the handle members 10 are shown again. The handle portions 98, 124 of FIGS. 5, 6 are identical to the handle portions of FIGS. 3, 4, and the disclosure regarding them above applies wholly to the handle portions of 98, 124 of FIGS. 5, 6. More particularly, the handle gripping portion 122 of the left-hand handle 98 projects forward of the right-hand side member 102 of the left-hand handle 98 and the handle gripping portion 144 of the right-hand handle 124 projects forward of the left-hand side member 126 of the right-hand handle 124, with forward defined as inwardly of the top edge 28 of the load 28. The arcuate handle portions 120, 142 are each covered with a protective handgrip cushion 184 to reduce pressure on the user's hands. These same handgrip cushions can be used on the handle portions 60, 90 of FIGS. 1, 3, 4 for the same purpose.

The handle members 10 are preferably each made of molded fiberglass in one piece each, which results in a scratch resistant, strong, light-weight handle member 10. Alternatively, the handle members 10 may be made of welded bent steel, aluminum or the like; may be made from bar stock with welded seams and so forth. The handle members 10 may also be coated with a plastic covering, such as tool dip so that they do not mar the surfaces they are attached to, making the handle members 10 suitable for use with loads that are not to be marred. In any case, the handle members 10 are rigid and the connection between the portion that contacts the load and the handles themselves is strong.

While the present invention has been described in accordance with the preferred embodiments thereof, the description is for illustration only and should not be construed as limiting the scope of the invention. Various changes and modifications may be made by those skilled in the art without departing from the spirit and scope of the invention as defined by the following claims.

I claim:

1. A device for facilitating carrying objects having four side walls defining a rectilinear cross section comprising:
   a. a pair of separate elongated handle members, said pair of separated elongated handle members further comprising a left-hand handle member adapted to fit along a left-hand edge of a load and a right-hand handle member adapted to fit along a right-hand edge of said load, each said left-hand handle member and said right-hand handle member further comprising a handle at its top edge, each said handle projecting upward of an upper end of each said elongated handle member and connected thereto by a neck and each said handle projecting forwardly over said load parallel to each said edge of said load to which each said handle member fits against wherein each said handle projects forward of each said elongated member and over said load and is connected to each said elongated member at an upper end of said elongated member;

b. a hand grip opening in each said handle; and c. a plurality of apertures in said left-hand handle member and in said right-hand handle member for receiving screws inserted into said load.

2. A device for facilitating carrying objects having four side walls defining a rectilinear cross section comprising:

a. a pair of separate elongated handle members, said pair of separate elongated handle members further comprising a left-hand handle member adapted to fit along a left-hand edge of a load and a right-hand handle member adapted to fit along a right-hand edge of said load, each said left-hand handle member and said right-hand handle member further comprising a handle at its top edge, wherein each said handle projects forward of each said elongated member and over said load and is connected to each said elongated member at an upper end of said elongated member wherein said each elongated handle member further comprises a left-hand side member and a right-hand side member joined together along one edge of each said left-hand side member and said right-hand side member at a 90° angle b. a hand grip opening in each said handle; and c. a plurality of apertures in said left-hand handle member and in said right-hand handle member for receiving screws inserted into said load.

3. A device for facilitating carrying objects having four side walls defining a rectilinear cross section comprising:

a. a pair of separate elongated handle members, said pair of elongated handle members further comprising a left-hand handle member adapted to fit along a left-hand edge of a load and a right-hand handle member adapted to fit along a right-hand edge of said load;

b. said left-hand handle member further comprising an elongated left-hand side member and an elongated right-hand side member connected along their lengths at a 90° angle, with each said elongated left-hand side member and said right-hand side member having the same length and each said elongated left-hand side member and said right-hand side member having a top end and a bottom end, a handle extending upward from said left-hand side member and projecting forwardly over said load, said handle further comprising an arcuate grip opening, and a plurality of apertures adjacent to said upper ends and a plurality of apertures adjacent to said lower end of each of said left-hand side member and said right-hand side member, said apertures adapted for receiving sheet metal screws screwed directly into said load; and a straight top edge on said right-hand side member adapted for serving as an indexing guide for alignment of said left-hand handle with a top edge of said load; and c. said right-hand handle member further comprising an elongated left-hand side member and an elongated right-hand side member connected along their lengths at a 90° angle, with each said elongated left-hand side member and said right-hand side member having the same length and each said elongated left-hand side member and said right-hand side member having a top end and a bottom end, a handle extending upward from said right-hand side member and projecting forwardly over said load, said handle further comprising an arcuate grip opening, and a plurality of apertures adjacent to said upper ends and a plurality of apertures adjacent to said lower ends of each of said left-hand side member and said right-hand side member, said apertures adapted for receiving sheet metal screws screwed directly into said load; and a straight top edge on said left-hand side member adapted for serving as an indexing guide for alignment of said right-hand handle with a top edge of said load.

* * * * *